US012681185B2

(12) United States Patent
Cutrignelli et al.

(10) Patent No.: US 12,681,185 B2
(45) Date of Patent: Jul. 14, 2026

(54) TIME-OF-FLIGHT SENSOR AND SYSTEM

(71) Applicant: Sony Semiconductor Solutions Corporation, Kanagawa (JP)

(72) Inventors: Luca Cutrignelli, Brussels (BE); Rachit Mohan, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1045 days.

(21) Appl. No.: 17/621,921

(22) PCT Filed: Jun. 24, 2020

(86) PCT No.: PCT/EP2020/067695
§ 371 (c)(1),
(2) Date: Dec. 22, 2021

(87) PCT Pub. No.: WO2021/004791
PCT Pub. Date: Jan. 14, 2021

(65) Prior Publication Data
US 2022/0229189 A1      Jul. 21, 2022

(30) Foreign Application Priority Data

Jul. 5, 2019     (EP) ..................................... 19184635

(51) Int. Cl.
*G01S 17/894*          (2020.01)
*G01S 7/4863*          (2020.01)
(Continued)

(52) U.S. Cl.
CPC ............ *G01S 17/894* (2020.01); *G01S 7/497* (2013.01); *G01S 17/10* (2013.01); *G01S 7/4863* (2013.01)

(58) Field of Classification Search
CPC ........ G01S 17/894; G01S 7/497; G01S 17/10; G01S 7/4863
See application file for complete search history.

(56) References Cited

U.S. PATENT DOCUMENTS 5,517,248 A * 5/1996 Isoda ................... G11B 27/031
                                                            348/E7.015
2003/0002537 A1* 1/2003 Schaller ................ H04J 3/0685
                                                            370/503
(Continued)

FOREIGN PATENT DOCUMENTS

EP           0 713 102 A1      5/1996
WO     WO 2017/149526 A2      9/2017
WO     WO 2018/207030 A1      11/2018

OTHER PUBLICATIONS

International Search Report and Written Opinion mailed Sep. 18, 2020 in connection with International Application No. PCT/EP2020/067695.

*Primary Examiner* — Thanh Luu
*Assistant Examiner* — Mai Thi Ngoc Tran
(74) *Attorney, Agent, or Firm* — Wolf, Greenfield & Sacks, P.C.

(57) ABSTRACT

The present disclosure pertains to a time-of-flight system, having: an illumination source, a time-of-flight camera having a time-of-flight sensor, including: a light sensing circuitry for detecting light and outputting light sensing signals; and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames, and a host circuitry connected (Continued)

Fig. 3 via a bus to the time-of-flight camera, wherein the host circuitry is configured to configure the sequencer circuitry.

20 Claims, 4 Drawing Sheets

(51) Int. Cl.
| | | |
|---|---|---|
| *G01S 7/497* | (2006.01) | |
| *G01S 17/10* | (2020.01) | |

(56) References Cited

U.S. PATENT DOCUMENTS

| | | | |
|---|---|---|---|
| 2006/0056791 A1* | 3/2006 | Tzschoppe | H04N 13/359 |
| | | | 348/E13.044 |
| 2007/0182528 A1 | 8/2007 | Breed et al. | |
| 2009/0249363 A1* | 10/2009 | Dobyns | G01R 13/0263 |
| | | | 719/318 |
| 2015/0346325 A1* | 12/2015 | Giacotto | G01C 3/08 |
| | | | 356/5.01 |
| 2015/0377964 A1 | 12/2015 | Patukuri et al. | |
| 2016/0003937 A1* | 1/2016 | Metz | G01S 7/48 |
| | | | 356/5.01 |
| 2016/0029968 A1* | 2/2016 | Lerner | A61B 5/725 |
| | | | 600/595 |
| 2016/0131755 A1* | 5/2016 | Wijbrans | G01S 7/40 |
| | | | 342/458 |
| 2016/0182895 A1 | 6/2016 | Ko et al. | |
| 2018/0278843 A1* | 9/2018 | Smith | G01S 17/894 |

* cited by examiner

16 time_triggers=4, sequence_period=4 time_triggers list=[1,2,3,4]    16a sequence_location &
number_of_operations list
= (A,x, B,y, C,w, D,z)

A seq1
B seq2
C seq3    Sequence memory    16b
D seq4

TIME-OF-FLIGHT SENSOR AND SYSTEM

CROSS-REFERENCE TO RELATED APPLICATIONS

This application claims the benefit under 35 U.S.C. § 371 as a U.S. National Stage Entry of International Application No. PCT/EP2020/067695, filed in the European Patent Office as a Receiving Office on Jun. 24, 2020, which claims priority to European Patent Application Number 19184635.1, filed in the European Patent Office on Jul. 5, 2019, each of which is hereby incorporated by reference in its entirety.

TECHNICAL FIELD

The present disclosure generally pertains to a time-of-flight sensor and a time-of-flight system with such a time-of-flight sensor.

TECHNICAL BACKGROUND

Generally, time-of-flight systems are known, which are able to determine a distance to a scene or to an object on the basis of a roundtrip delay of emitted light. The light is emitted by a light source of the time-of-flight system and a time-of-flight image sensor detects the light reflected from the scene.

Typically, the time-of-flight image sensor outputs the image information in the form of frames, wherein the content of the frames may be adjusted by setting a configuration of the frames, e.g. by setting the time-of-flight image sensor in an associated operation mode.

A common architecture of time-of-flight systems has a host and the time-of-flight image sensor, wherein the host and the time-of-flight image sensor communicate over a bus with each other, such as the I²C bus system or the like.

In such systems, the host may be configured to control the time-of-flight image sensor, for example, in order to set the time-of-flight image sensor in another operation mode or in order to configure the content of the frames which are output by the time-of-flight image sensor to the host for further processing.

However, typically, this requires that a control path and a data path are synchronous to each other.

Although there exist techniques for providing a time-of-flight sensor and a time-of-flight system, it is generally desirable to provide a time-of-flight sensor and a time-of-flight system, which at least partially improve such known time-of-flight sensors and a time-of-flight systems.

SUMMARY

According to a first aspect, the present disclosure provides a time-of-flight system, comprising an illumination source, a time-of-flight camera having a time-of-flight sensor, including: a light sensing circuitry for detecting light and outputting light sensing signals; and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames, and a host circuitry connected via a bus to the time-of-flight camera, wherein the host circuitry is configured to configure the sequencer circuitry.

According to a second aspect, the disclosure provides a time-of-flight sensor comprising a light sensing circuitry for detecting light and outputting light sensing signals; and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
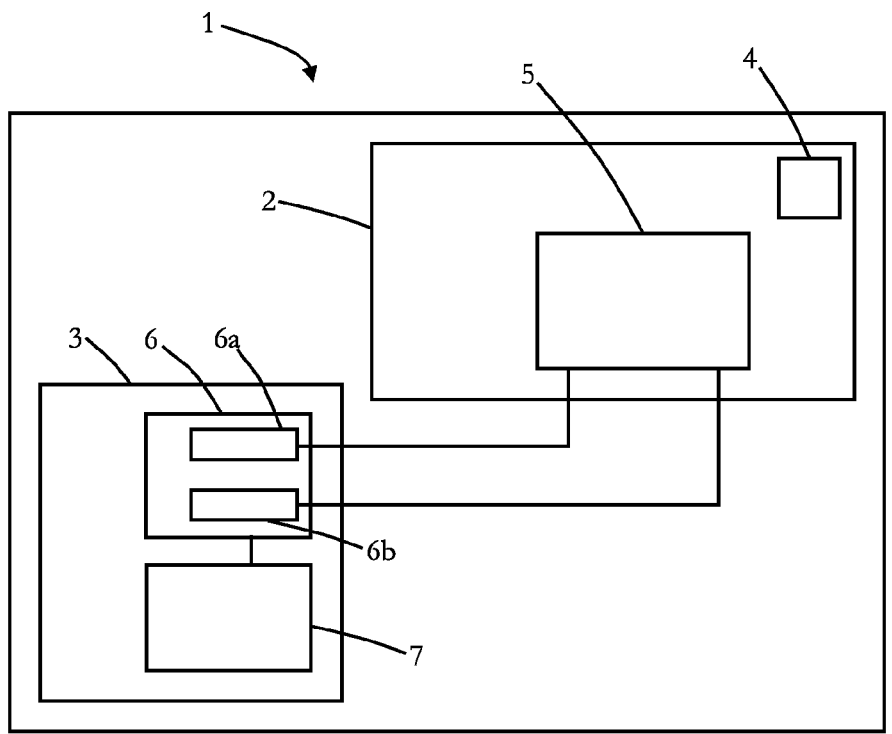
FIG. 1 is a block diagram of an embodiment of a time-of-flight system.

Before a detailed description of the embodiments under reference of FIG. 1 is given, general explanations are made.

As mentioned in the outset, an architecture of time-of-flight (ToF) systems may have a host and a time-of-flight image sensor, and the host and the time-of-flight image sensor may communicate over a bus with each other, such as the I²C bus system, MIPI (Mobile Industry Processor Interface Alliance) or the like, and in such systems, the host may be configured to control the time-of-flight image sensor, for example, in order to set the time-of-flight image sensor in another operation mode or in order to configure the content of the frames which are output by the time-of-flight image sensor to the host for further processing.

It has been recognized that this may require that a control path and a data path between the host and the time-of-flight image sensor are synchronous to each other, since, for instance, a change of the content of the frames on a frame-by-frame basis between two adjacent frames may not be possible, since the communication speed of the control path is typically slower compared to the frame rate with which that data is transmitted over the data path. Moreover, also the common electronic control of the ToF image sensor may not be fast enough for changing the content of the frames or for switching an operation mode of the ToF image sensor from one frame to the next frame.

Consequently, some embodiments pertain to a time-of-flight sensor having a light sensing circuitry for detecting light and outputting light sensing signals, and a logic circuitry for processing the light sensing signals from the light sensing circuitry, wherein the logic circuitry includes a sequencer circuitry and a register circuitry. The register circuitry includes multiple registers for storing data which are derived on the basis of the light sensing signals and the sequencer circuitry is adapted to select at least a first set of registers of the register circuitry and a second set of registers of the register circuitry for dynamically providing a first type of frames based on the selected first set of registers and a second type of frames based on the selected second set of registers, wherein the first type of frames and the second type of frames are generated in a defined sequence of frames.

The ToF sensor may be a ToF image sensor for imaging light from a scene, wherein the light stems, for example, from an illumination source, but the light can also stem from the sun, an environmental illumination, indoor illumination, etc.

Hence, the light sensing circuitry for detecting light and outputting light sensing signals may be based on known technologies for light detection and it may include pixels or photosensitive elements, which may be arranged in an array, or the like, and which may be based on known technologies, such as CMOS (complementary metal-oxide-semiconductor), CCD (charge coupled device), SPAD (single photon avalanche diode), CAPD (current assisted photonic demodulator), etc.

The light sensing circuitry outputs the light sensing signals, which may be analog and/or digital signals, to the logic circuitry. The light sensing circuitry may include analog-to-digital converters, logic circuits, etc., for generating the light sensing signals.

The logic circuitry has a sequencer circuitry and a register circuitry, which are (directly or indirectly) connected with each other or coupled to each other (e.g. over other circuits, units, etc.).

The register circuitry has multiple registers for storing data, wherein the data is derived on the basis of the light sensing signals. The data may be included in the light sensing signals from the light sensing circuitry or it may be derived by the logic circuitry on the basis of the received light sensing signals (or a mixture of both, i.e. partially included in the light sensing signals and partially derived on the basis of the light sensing signals). The data may be indicative for different types of information, such that also the registers include different types of information. The different types of information may be for example, without limiting the present disclosure in that regard, phase information, depth information, color information, or the like, such information for all pixels (light sensing elements) or group of pixels (light sensing elements) or the like of the light sensing circuitry, etc.

The sequencer circuitry may be configured as a unit, logic chip or processor, or the like, it may include further sub-units, memory (memories), etc.

The sequencer circuitry is adapted to select at least a first set of registers of the register circuitry and a second set of registers of the register circuitry for dynamically providing a first type of frames based on the selected first set of registers and a second type of frames based on the selected second set of registers, wherein the first type frames and the second type frames are generated in a defined sequence of frames.

The first set of registers and the second set of registers may be different or identical, they may have partially the same registers or may have completely different registers. Moreover, the number of selected registers in the first and second sets may be equal or different.

On the basis of the selected first and second sets, an associated first type of frames and second type of frames can be dynamically provided, e.g. generated. The generation of first type and second type frames may be performed by the logic circuitry (e.g. a circuitry, unit, processor, controller or the like included in the logic circuitry).

The first type frames and the second type frames are generated in a defined sequence of frames, wherein the defined sequence of frames may be predetermined or random, pseudorandom or any other kind of sequence. Hence, in some embodiments, the "defined sequence" may include the definition of how the sequence is generated (e.g. randomly or pseudorandomly, predetermined), but not necessarily the definition of the exact point of time or order of the first and second type frames, while in other embodiments the "defined sequence" may define the points of time and/or the order, number or other parameters of the first and second type frames (and additional frames, if applicable) in the sequence of frames.

As the sequencer circuitry is in the logic circuitry of the ToF sensor, the sequencer circuitry may switch between the set of registers for a first and a second type frame (or more) between two consecutive frames. Moreover, the sequencer circuitry may be programmed such that first, second and more different type of frames can be generated by setting the registers accordingly without having the need, for example, to switch the ToF sensor in different operating modes. Moreover, as the logic circuitry with the sequencer circuitry sets the first and second sets of registers, there is no additional interaction between a host and the ToF sensor necessary, except for, for example, an initial (or intermediate, dynamic, etc.) programming of the logic circuitry or sequencer circuitry or re-programming, or the like.

In some embodiments the sequencer circuitry includes a memory for storing sequence configurations, the sequence configurations determining the first and second sets of registers and the defined sequence for the generation of the defined sequence of frames.

In general, the memory may be any type of memory, a random-access memory, a non-volatile memory, a storage, etc. The sequence configurations may be in the form of data (bits, data words, file, programming language, etc.) and may be transferred, for example, to the ToF sensor and stored in the memory of the sequencer circuitry. The sequence configurations may include instructions, control data or other information which is used by the sequencer circuitry for determining the first and the second sets of registers and for determining the defined sequence, e.g. whether the defined sequence is random, pseudorandom, predetermined (e.g. based on a pattern, regularly, one frame, etc.), etc. Thereby, the sequencer circuitry can be easily programmed by just transferring the sequence configurations in its memory.

In some embodiments, the sequence configurations are divided in a first part and in a second part, wherein the first part defines at least one of: number of types of frames, location of frames in the sequence of frames, trigger for first and second type of frames, and wherein the second part defines the first and second sets of registers. The first part may be stored in a first part of the memory and the second part may be stored in a second part of the memory. The first part and second part may be different memory locations in a common memory space or the first part and the second part of the memory may also have different functions and/or may be even structurally separated from each other. For instance, the first part may be for the basic configuration of the sequencer circuitry, e.g. the number of types of frames, location of frames in the sequence of frames, trigger for first and second type of frames, or the like, wherein the second part includes the sets of registers which are used for generating the associated frames. Hence, during generation of frames, the basic frame structure may be defined by the content in the first part of the memory, while the content of the frames may be defined by the content in the second part of the memory, such that only the second part of the memory may be read out during frame generation.

In some embodiments, the sequencer circuitry is programmable, as also indicated above, e.g. by transmitting the respective sequence configurations to it or by defining the sets of registers, and the defined sequence and transmitting corresponding information to the sequencer circuitry or by storing such information such that the sequencer circuitry can access it.

In some embodiments, the ToF sensor further has a multiplexer and a bus-interface, wherein the bus-interface and the sequencer circuitry are connected via the multiplexer to the register circuitry. The multiplexer may perform time-multiplexing between the sequencer circuitry and the bus-interface. Thereby, a host or other entity can access the register circuitry over the bus-interface while the sequencer circuitry can also access the register. The bus-interface may be, for example, configured for communication over $I^2C$ bus, MIPI bus, or other bus-systems.

In some embodiments, the ToF sensor further has a controller configured to generate the defined sequence of frames on the basis of the selected first and second sets of registers. For instance, the controller reads out the data from the register, on the basis of a predetermined frame rate. As the sequencer circuitry sets the register circuitry in accordance with the first and second sets of registers, the controller will automatically receive and generate the first and second type of frames in the order of the defined sequence. The controller may have a processor, logic circuits, memory, etc.

In some embodiments, the sequencer circuitry sets the register circuitry according to the selected first and second sets of registers, such that the register outputs the first and second type frames, e.g. according to the defined sequence of frames. As discussed, the sequencer circuitry may also set the register circuitry in accordance with the sequence configurations discussed above.

In some embodiments, the first type of frames is configured for providing time-of-flight data and the second type of frames is configured for providing enhanced sensor data, thereby, for example, a time-of-flight measurement can be performed, wherein simultaneously enhanced sensor data may be received in the second type frames, e.g. for improving the time-of-flight measurement, for detecting an interfering other time-of-flight system, for getting diagnostic data from the sensor, etc.

Some embodiments pertain to a time-of-flight system with an illumination source and a time-of-flight camera having a time-of-flight sensor, as discussed herein, having a light sensing circuitry for detecting light and outputting light sensing signals, and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames, as discussed above. The ToF system further has a host circuitry connected via a bus to the time-of-flight camera, wherein the host circuitry is configured to configure the sequencer circuitry. The illumination source may also be included in the ToF camera.

The host circuitry may include a processor, logic circuits, memory, etc. The host circuitry may transmit configuration data to the logic circuit (to the sequencer circuitry), e.g. sequence configurations discussed herein, for configuring the sequencer circuitry accordingly.

The bus may be, for example, based on $I^2C$ bus, MIPI bus, or another bus-systems, which is adapted for inter-processual communication.

The host circuitry may be configured for performing time-of-flight measurements (distance measurements), generating depth maps, performing diagnostics of the ToF camera (sensor), detecting interfering ToF cameras/systems, etc., on the basis of the received frames.

In some embodiments, the first type of frames is configured for providing data for a first mode and the second type of frames is configured for providing data for a second mode. Thereby, frames configured for the associated modes can be generated by the ToF camera (sensor) and transmitted to the host circuitry over the bus for further processing, and, for example, as mentioned, for time-of-flight measurements (distance measurements), generating depth maps, performing diagnostics of the ToF camera (sensor), detecting interfering ToF cameras/systems, etc., which may be performed by the host circuitry. Hence, the host circuitry can process the first type frames in the first mode (e.g. time-of-flight mode) and the second type frames in the second mode (e.g. enhanced mode, diagnostic mode, etc.).

In some embodiments, the illumination source is adapted to be driven in a first operation mode associated with the first mode and in a second operation mode associated with the second mode. The first operation mode may be, for example, a time-of-flight operation mode, wherein the illumination source emits pulsed light for a direct ToF measurement (e.g. for measuring a roundtrip time of the emitted light pulses), or continuous light for an indirect ToF measurement (where a phase shift of the continuous light wave is measured), etc. In the second operation mode, the illumination source may, for example, perform an infrared or RGB illumination for taking a two-dimensional image, an image for getting diagnostic information, etc.

The illumination source may include one or more parts/sources for providing different types of illumination, e.g. also for the first operation mode and/or the second operation mode.

The illumination source may include one or more LED (light emitting diode), VCSEL (vertical cavity surface emitting laser), or any other type of illumination element(s).

In some embodiments, the first operation mode is at least one of a spotted illumination mode, a zone illumination mode and a uniform illumination mode (all configured for time-of-flight measurements) and the second mode is at least one of a full-field illumination mode, uniform mode or the like. In other embodiments, also the second operation mode may include at least one of a spotted illumination mode, a zone illumination mode and a uniform illumination mode or the like, e.g. for determining a point of interest, wherein then in the point of interest may be illuminated by the illuminations source in the first operation mode for performing a time-of-flight measurement.

In some embodiments, as also indicated above, the first mode is a time-of-flight mode and the second mode is an enhanced sensor data mode.

In some embodiments, the first mode includes at least one of the following modes: accuracy, processing load, measured range, motion robustness, power. These modes may be optimized for the associated purpose, e.g. accuracy (predetermined, e.g. high or low), processing load (predetermined, e.g. high or low), measured range (e.g. determined distance range), etc.

In some embodiments, the second mode is at least one of the following modes: resolution, signal-to-noise ratio, two-dimensional imaging.

In some embodiments, the combination between first and second mode is at least one of the following:

Accuracy mode (first mode) and resolution (second mode), wherein the accuracy mode is a spotted mode and the illumination source is driven in a first operation mode and performs a spotted illumination and wherein the resolution mode is a full-field mode and the illumination source is driven in a second operation mode and performs a full-field illumination.

Processing load (first mode) and resolution (second mode): In the processing load mode full frames and binned frames are generated in the resolution mode an IR (infrared) imaging is performed and binned frames are generated.

Measured range (first mode) and signal-to-noise ratio, SNR (second mode). In the measured range mode, the time-of-flight measurement may be performed in a distance range, e.g. to a specific object or scene, which has been detected and in the SNR mode, a better SNR is determined in order to improve the distance accuracy. Both modes made be performed with a high-dynamic range (HDR).

Motion robustness (first mode) and resolution (second mode): In such embodiments, a mosaic sensor may be employed, such that, for example, two or more phases can be imaged in the motion robustness mode. In the second mode, full resolution imaging is performed, in order to get a better resolution and, thus, an improved distance map.

Power (first mode) and resolution (second mode): The power mode may be a mode where power is saved and, thus, in the second mode the resolution may be optimized. A mosaic sensor may be employed, such that, for example, in the power (saving) mode, only a part of the pixels may be active, whereas in the resolution mode more or all pixels may be used.

Motion robustness (first mode) and SNR (second mode): In such embodiments, a mosaic sensor (see above) or a two-phase sensor or time-of-flight measurement may be implemented, such that in the motion robustness mode only one phase is imaged per frame, while in the SNR mode, the SNR is optimized.

Power (first mode) and resolution (second mode): In such embodiments, also a mosaic sensor or a two-phase sensor or time-of-flight mode may be implemented. For instance, in the power mode, only one-phase is measured and in the resolution mode, all phases for a full-field are imaged or full-resolution image is made.

In some embodiments, the second mode is a diagnostic mode, as indicated above. In the diagnostic mode, noise measurements may be performed, e.g., in order to detect a defect of the sensor, difficult or specific ambient light situations, interfering illuminations, e.g. from other ToF systems/cameras. In such embodiments, there may be provided an internal/external feedback loop for performing diagnostic measurements. In some embodiments, in the diagnostic mode a calibration of the ToF camera or system is performed, wherein the calibration may be performed in real time. For instance, in the case of a two-phase (or more phase) camera or mosaic sensor, one phase or part of the sensor may be used for calibration. Moreover, in some embodiments, the diagnostic mode is performed, as also discussed herein, for enhancing the depth measurement, and it may include two-dimensional IR imaging, different illumination patterns (e.g. spot, zone uniform, as discussed above), proximity mode, and/or normal mode.

In some embodiments, the generation of second type frames is started in response to a trigger event. The trigger event may be received from external and/or from the host or may be internal (e.g. stored in the sequencer circuitry (e.g. its memory)). The second type frame may be generated, e.g. in response to the trigger event, periodically, according to a predetermined pattern, randomly, once.

In some embodiments, the following cases may be implemented for triggering the generation of the second type frames:

the trigger event is initiated by the host and the second type frame is generated/repeated periodically;

the trigger event is initiated by the host and the second type frame is sent only once;

the trigger event is initiated externally and the second type frame is generated/repeated periodically;

the trigger event is initiated externally and the second type frame is generated only once;

the trigger event is initiated internally and the second type frame is generated/repeated periodically;

the trigger event is initiated internally and the second type frame is generated only once.

In some embodiments, the Tof sensor, host or system is able to analyze diagnostic data and to adapt its configuration accordingly. The host system/circuitry may have a low level SW (software) stack (driver) capable of analyzing ToF camera/sensor data including first and second type frames and may be configured to apply a calibration on data, which is provided to a high level SW stack. Moreover, some embodiments, the ToF sensor/system has a built-in diagnostic and is configured to adapt the camera/sensor configuration.

In some embodiments, output data including the first and second type frames (and optionally more types of frames) may have at least one of the following characteristics. The output data may present or include a richer set of information compared to regular ToF frames, since they combine regular time-of-flight information and enhanced information, as discussed above, e.g. including diagnostic information. The combination of this information may provide a more accurate depth measurement in some embodiments. The output data may be collected in some embodiments with a ToF sensor/camera configuration that is dynamically adapted to an environment/object condition or the like, in order to have a higher SNR and more accurate depth measurement.

Hence, in some embodiments, an adaptive behaviour of the ToF system is possible without the need of interaction or with less interaction between a host controller and the ToF device/camera.

Moreover, as also discussed above, in some embodiments, the second type frames are generated during the normal ToF device operations.

Returning to FIG. 1, there is illustrated in a block diagram an embodiment of a ToF-system 1 having a ToF camera 2 and a host circuitry 3 (host processor).

The ToF camera 2 has an illumination source 4, which is configurable to be driven in at least a first and a second operation mode, as discussed herein. It includes multiple LED elements.

The ToF camera 2 has also a ToF sensor 5 for detecting light and outputting light sensing signals to the host circuitry 3.

The host circuitry 3 has a low level software stack 6 with a processing unit 6a and a configuration unit 6b and a high level software stack 7 for high level processing of data received from the low level software stack 6, wherein the high level software stack 7 is connected to the low level software stack 6. The processing unit 6a is also configured as a control interface connected to a data bus which connects the host-circuitry 3 with the ToF sensor 5 and the configuration unit 6b is configured as a configuration interface connected to a configuration/control bus which connects the host circuitry 3 with the ToF sensor 5.

Figure 2:
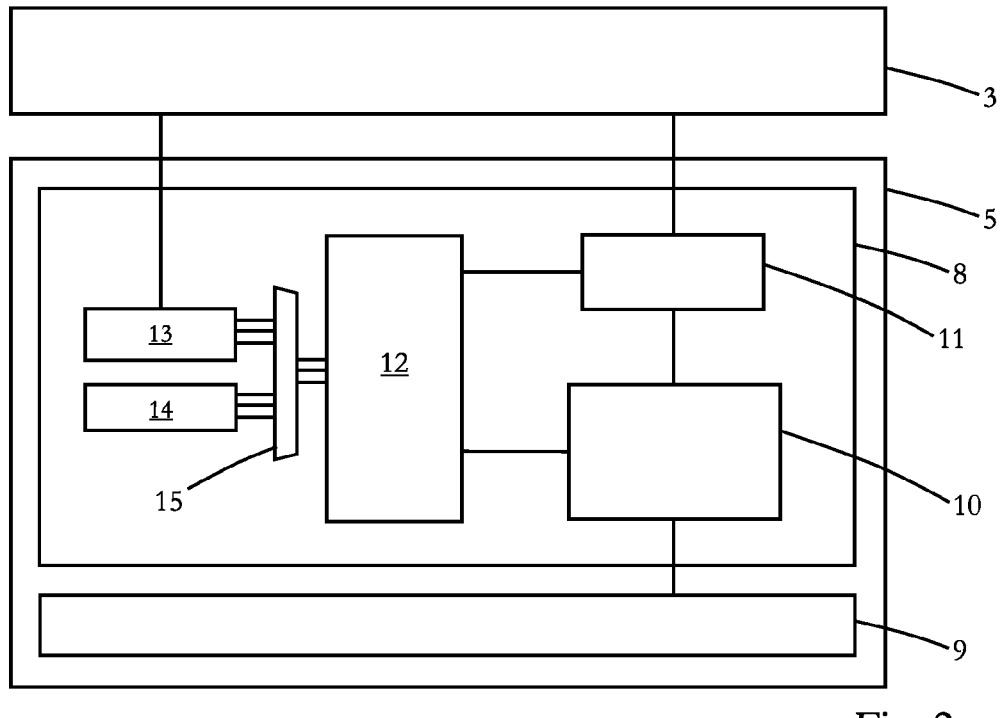
FIG. 2 is a block diagram of an embodiment of a time-of-flight sensor coupled to a host included in the time-of-flight system of FIG. 1.

FIG. 2 illustrates the ToF sensor 5 in a block diagram in more detail.

The ToF sensor 5 has logic circuitry 8 and a light sensing circuitry 9 including an array of light detection pixels, analog-to-digital conversion, etc., such that the light sensing circuitry 9 can output light sensing signals to the logic circuitry 8 in response to detected light.

The log circuitry 8 has a processor/control unit 10, a data interface 11, a register circuitry 12, a bus controller 13 (which is a I²C slave controller), a sequencer circuitry 14 and a multiplexer 15.

The control unit 10 is connected to the light sensing circuitry 9 and receives the light sensing signals from it, which are digitized by analog-to-digital conversion performed by the light sensing circuitry 9, and passes the digitized light sensing signals to the register circuitry 12, to which it is connected, for intermediate storage.

The control unit 10 is also connected to the data interface 11, which, in turn, is connected to the processing unit 6a of the host circuitry 3, such that the processing unit 6a of the host circuitry 3 and the control unit 10 of the ToF sensor 5 can communicate over the data interface 11 with each other.

On the other hand, the bus controller 13 is connected over an I²C bus with the configuration unit 6b of the host circuitry, and it is connected to the register circuitry 12 and to the sequencer circuitry 14 over the multiplexer 15.

Hence, the configuration unit 6b of the host circuitry 3 can transmit control or configuration data/commands over the I²C bus and the bus controller 13 to the sequencer circuitry 14 for controlling and/or configuring the sequencer circuitry 14. For instance, the configuration unit 6b can also transmit sequence configurations as discussed herein to the sequencer circuitry 14.

The control unit 10 is configured to generate data frames, as will also be discussed further below, on the basis of the settings of the registers of the register circuitry 12, which in turn is set by the sequencer circuitry 14, e.g. based on sequence configurations received from the configuration unit 6b of the host circuitry 3.

In this embodiment, the ToF system is real-time configurable, since the sequencer circuitry 14 is able to change the type of frame from one frame to another by changing the associated register setting, such that, for example, during operation first type and second type frames can be generated.

Figure 3:
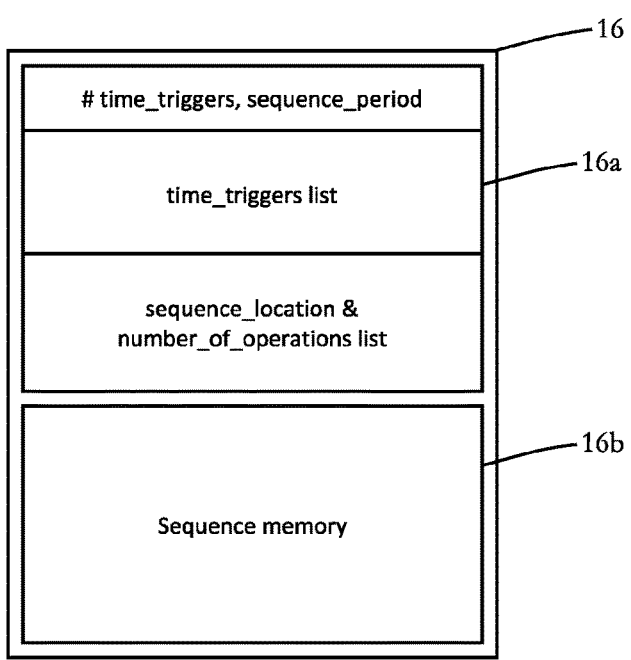
FIG. 3 is a block diagram of an embodiment of a memory of a sequencer circuitry included in the time-of-flight sensor of FIG. 2.

FIG. 3 illustrates a memory 16 of the sequencer circuitry 14 for storing sequence configurations, which may be received from the configuration unit 6b of the host circuitry 3 and which configure the sequencer circuitry 14 and its states (such that the sequencer circuitry 14 may also be considered as a state machine).

The memory 16 has a first part 16a and a second part 16, wherein a first part of sequence configurations is stored in the first part 16a and a second part of sequence configuration is stored in the second part 16b. The memory 16 is a SRAM (static random access memory) in this embodiment, and the first part 16a and the second part 16b are logically separated from each other.

The first part of sequence configurations includes, for example: number of types of frames, location of frames in the sequence of frames, trigger for first, second, etc. type of frames, etc.

In the first part 16a, three data fields are illustrated, wherein the upper data field stores a number of triggers (e.g. time, "# time_triggers") and the period of a sequence ("sequence_period"), such that, for example, it is defined how often a specific frame is repeated.

In a second data field, in the middle, a list of the triggers is stored ("time_triggers list"), which indicates when and where in a sequence a specific frame type will be applied.

In a third data field, at the bottom, for instance, a sequence location is stored, i.e. a location ("sequence_location") and a length of the sequence ("number_of_operations list") in the second (sequence memory) part 16b are stored.

The second part of sequence configurations includes, for example, (first, second, etc.) sets of registers on the basis of which the frames are generated by the control unit 10.

In the following, different embodiments of use cases are discussed under reference of FIGS. 4 to 7, wherein the configurations may be implemented by transmitting corresponding sequence configurations from the host circuitry 3 to the sequencer circuitry 14, as discussed above.

Figure 4:
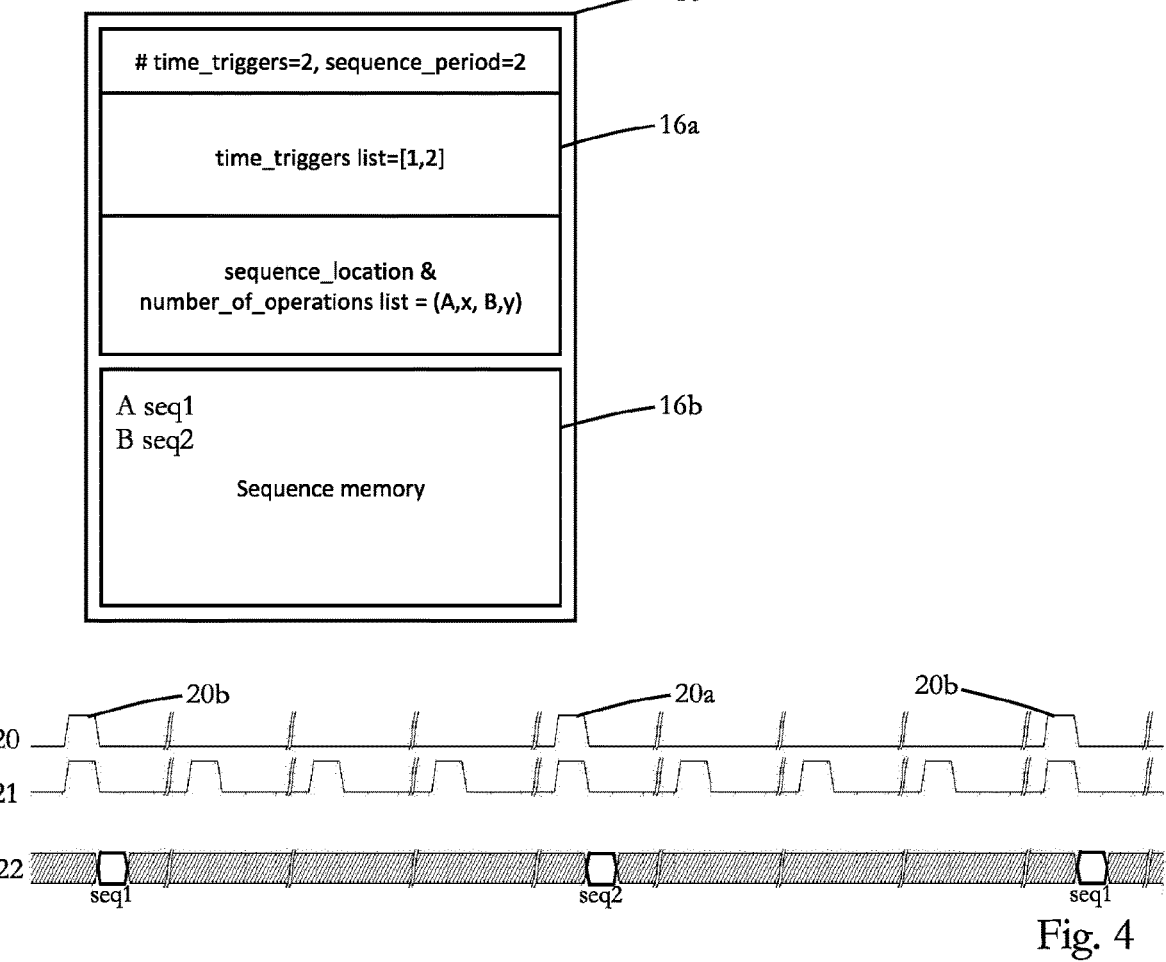
FIG. 4 illustrates an embodiment of a content in the memory of a sequencer circuitry and the generation of regular frames and diagnostic frames.

FIG. 4 illustrates an embodiment where the number of triggers is two ("# time_triggers=2") and the period of the sequence is also two ("seq_p=2"), the entries in the time trigger list are [1,2], and the locations of the sequences in the memory part 16b are "A" with a length "x" and "B" with a length "y", which is illustrated also as memory entries in the memory part 16a.

In the memory part 16b, the associated sequences defining the sets of registers for sequence "seq 1" and "seq 2" are stored at the memory locations A and B, respectively, wherein the first sequence "seq 1" has a set of registers for first type frames (e.g. regular ToF data frames) and the second sequence "seq 2" has a set of registers for second type frames (e.g. diagnostic data frames).

In the lower part of FIG. 4, an internal trigger sequence 20 is shown, wherein each peak 20a and 20b switches between the two different sequences "seq 1" and "seq 2", respectively, such that the associated frames can be generated.

At 21, the phases of associated frames are shown, wherein it can be seen that the trigger peaks 20a, 20b occur every fourth frame, since the length of one frame sequence is four in this embodiment.

At 22, a control command structure is illustrated, wherein a first command "seq 1" for the first sequence "seq 1" occurs after the first illustrated trigger peak 20*b* and, thus, the trigger 20*a* associated with the first command "seq 1" occurs roughly four frames after issuance of the first command "seq 1". Accordingly, the second trigger peak 20*b* is associated with the second command "seq 2".

Thus, the sequence and the type of the frames and the internal state of the ToF sensor 5 are switched between a regular mode (first mode) and a diagnostic mode (second mode) in this embodiment.

Hence, the programmable sequencer circuitry 14 allows to define sequences of commands to be executed to change the internal state of the ToF sensor 5 and it features a configuration area for defining the diagnostic/regular frames sequence patterns and respective memory areas 16*a* and 16*b* for defining their contents.

Figure 5:
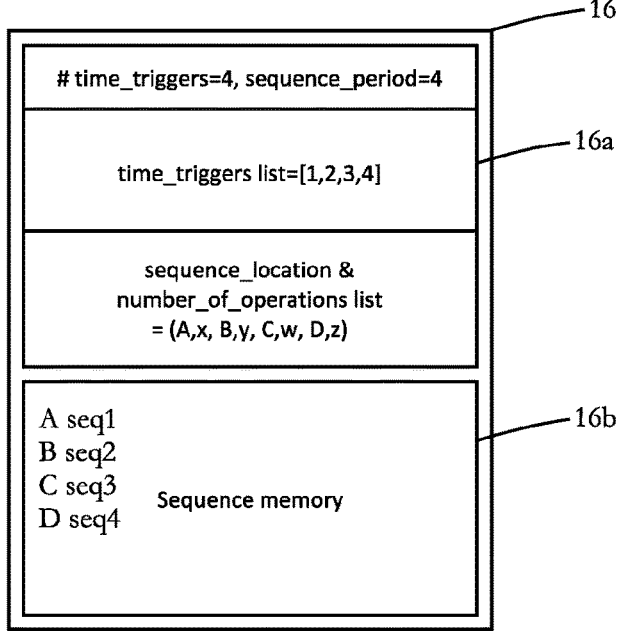
FIG. 5 illustrates another embodiment of a content in the memory of a sequencer circuitry and the generation of regular frames and diagnostic frames.
Figure 5:
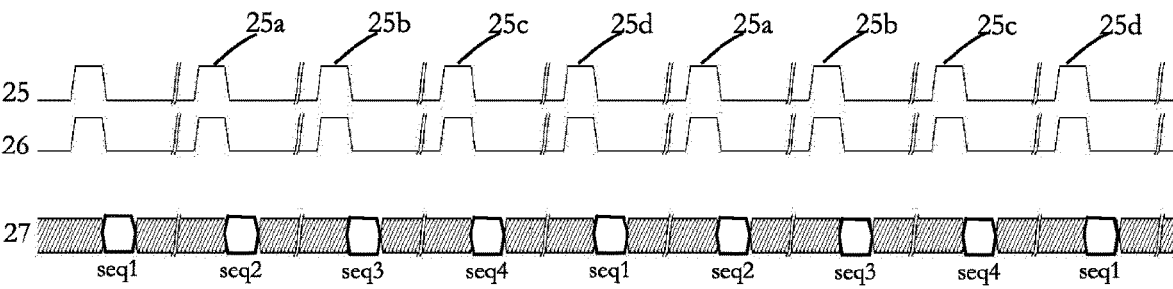

FIG. 5 illustrates an embodiment where the number of triggers is two ("# time_triggers=4") and the period of the sequence is four ("seq_p=4"), the entries in the time trigger list are [1,2,3,4], and the locations of the sequences in the memory part 16*b* are "A" with a length "x", "B" with a length "y", "C" with a length "w" and "D" with a length "z", which is illustrated also as memory entries in the memory part 16*a*.

In the memory part 16*b*, the associated sequences defining the sets of registers for sequence "seq 1" to "seq 4" are stored at the memory locations A to D. In this embodiment, exemplary, four different types of frames are generated, i.e. each sequence "seq 1" to "seq 4" (including different sets of registers) is associated with a different type of frame. Of course, the sequences "seq 1" to "seq 4" may also differ in the number of frames, such that, for example, only two different types of frames are used, but the number of frames within a sequence may also differ for the first type frames and the second type frames.

In the lower part of FIG. 5, an internal trigger sequence 25 is shown, wherein each peak 25*a*, 25*b*, 25*c* and 25*d* switches between the four different sequences "seq 1" to "seq 4", respectively.

At 26, the phases of associated frames are shown, wherein it can be seen that the trigger peaks 25*a-d* occur at every frame.

At 27, a control command structure is illustrated, wherein a first command "seq 1" for the first sequence "seq 1" occurs before the trigger peak 25*a*, a second command "seq 2" before the trigger peak 25*b*, a third command "seq 3" before the trigger peak 25*c*, a fourth command "seq 4" before the trigger peak 25*d*, a first command "seq 1" before the trigger peak 25*a* (occurring the second time), etc.

Thus, the frames and the internal state of the ToF sensor 5 are switched between sequences which are associated exemplary with a regular mode (first mode) and one or more diagnostic/enhanced data modes (second, third, fourth modes) in this embodiment.

Figure 6:
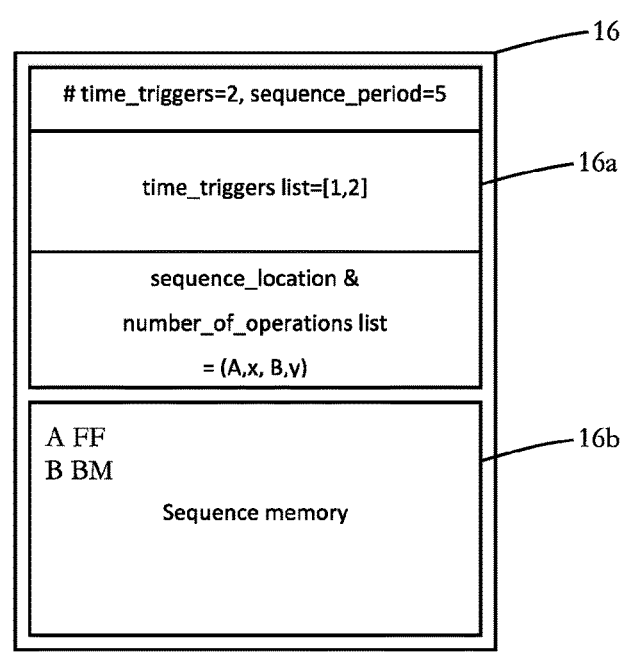
FIG. 6 illustrates another embodiment of a content in the memory of a sequencer circuitry and the generation of regular frames and diagnostic frames.
Figure 6:
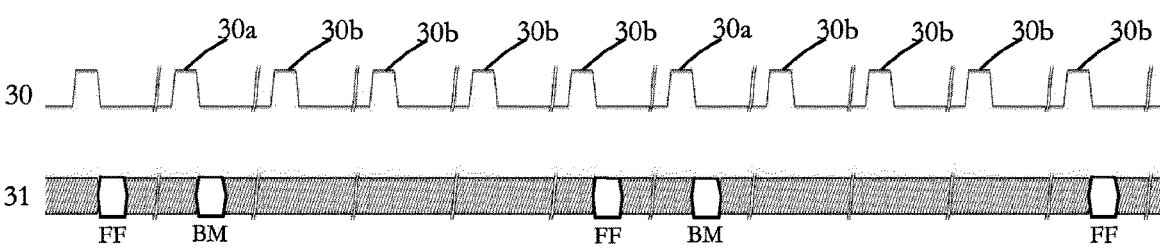

FIG. 6 illustrates an embodiment where the number of triggers is two ("# time_triggers=2") and the period of the sequence is five ("seq_p=5"), the entries in the time trigger list are [1,2], and the locations of the sequences in the memory part 16*b* are "A" with a length "x", and "B" with a length "y", which is illustrated also as memory entries in the memory part 16*a*.

In the memory part 16*b*, the associated sequences defining the sets of registers for sequence "FF" corresponding to a full frame sequence and "BM" corresponding to a binned frame (having a lower resolution) are stored at the memory locations A and B, respectively, wherein the first sequence "FF" has a set of registers for one FF frame (e.g. second type frame) and the second sequence "BM" has a second set of registers such that four binned frames (e.g. first type frames) are generated, wherein the ToF sensor 5 is also switched between a full frame mode and a binned frame mode for providing accordingly the light sensing signal and data.

Hence, in this embodiment, a bandwidth limitation due to a higher pixel count is overcome by applying a hybrid mode, wherein the operation switches between different modes, which combine benefits on execution time and quality, wherein in the present embodiment between the binning mode BM and the full resolution mode FF is switched, wherein, as mentioned, in the BM mode four frames are generated.

This means, assuming that the FF mode has a first set of registers Set_1 for generating the FF frame and the BM mode has a second set of registers Set_2 for generating the BM frames, a timing is as follows:

[switch full resolution mode] Set_1, [switch to binned mode], Set_2, Set_2, . . . , Set_2, [repeat]

In other words, the number of four BM frames is generated by repeating the associated set of registers accordingly in the associated sequence.

In the present embodiment, without limiting the present disclosure in that regard, the full resolution mode FF is used at a frame rate of 5 fps (frames per second) and the binned mode at a frame rate of 20 fps (since the binned mode BM has four frames per each frame of the full resolution mode FF, such that, when both modes are combined, the overall frame rate is 25 fps).

Hence, in some embodiments, the frame rate for the first and second frames and first and second (operation) modes may be different.

In the lower part of FIG. 6, an internal trigger sequence 30 is shown, wherein each peak 30*a* triggers setting Set_1 and, thus, generation of FF frames, and each peak 30*b* switches to the setting Set_2 and the generation of BM frames.

At 31, a control command structure is illustrated, wherein a first command "FF" causes the trigger peak 30*a* and the second command "BM" causes the trigger peaks 30*b*, such that one FF frame is generated and consecutively four BM frames.

Figure 7:
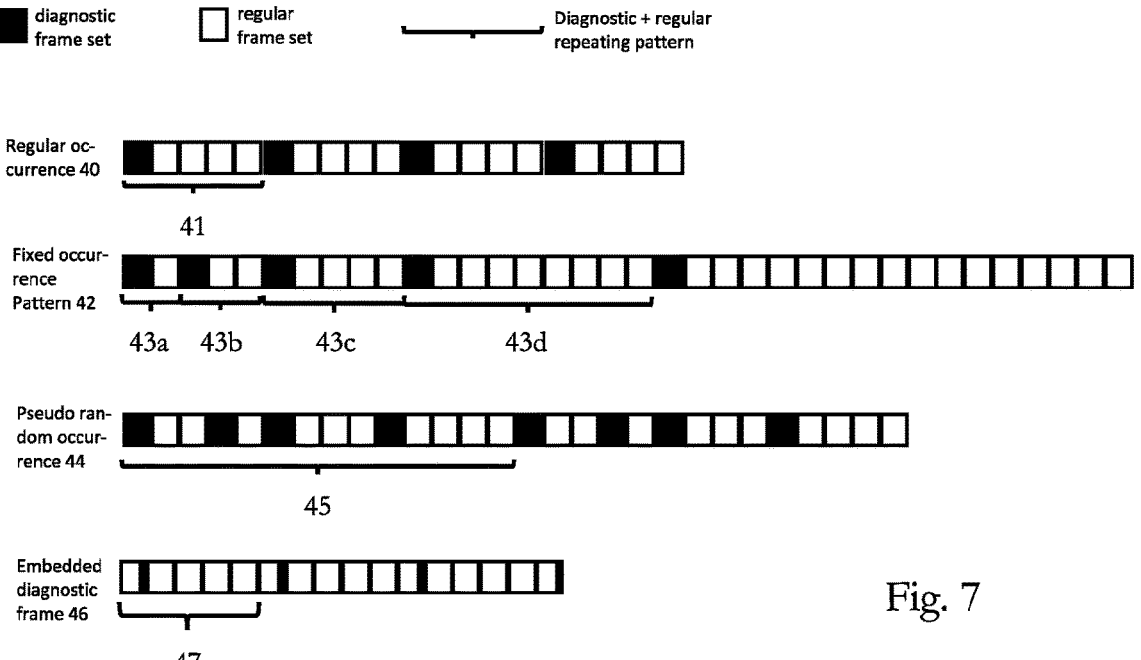
FIG. 7 illustrates different patterns of regular and diagnostic frames.

In the following, embodiments pertaining to different patterns for first and second type frames are discussed under reference of FIG. 7, showing such different patterns, wherein each pattern includes exemplarily diagnostic frame sets and regular frame sets as indicated in FIG. 7 and each pattern has a repeating pattern including such diagnostic and regular frame sets.

As discussed above, such patterns or sequences can be generated by having the associated sets of registers stored in the second part 16*b* of the memory 16 of the sequencer circuitry 14.

A first pattern 40, which is configured as a regular occurrence pattern, includes five frames in a repeating pattern 41, wherein the first frame includes a diagnostic frame followed by four regular frames, and then the repeating pattern is repeated.

A second pattern 42, which is configured as a fixed occurrence pattern, is formed according to a fixed rule. Each repetition pattern starts with a diagnostic frame and then with a number of regular frames which is doubled for each repetition, starting with one regular frame. Hence, in the first repetition pattern 43*a* one diagnostic frame and one regular frame are included, in the second repetition pattern 43*b* one diagnostic frame and two regular frames, in the third repetition pattern 43*c* one diagnostic frame and four regular frames, in the fourth repetition pattern 43d one diagnostic frame and eight regular frames, etc. Hence, in this embodiment, there is no repetition pattern which is just repeated without amendment.

A third pattern 44, which is configured as a pseudo-random occurrence pattern, includes a more complex repetition pattern 45, which is based on a pseudo-random distribution. The pseudo-random repetition pattern 45 includes a pseudo-random distribution of diagnostic frames and a pseudo-random number of regular frames. This pseudo-random repetition pattern 45 is then periodically repeated.

A fourth pattern 46, which is configured as a frame set including embedded diagnostic frames, has a repetition pattern 47 which has one mixed frame, wherein a diagnostic frame is embedded into a regular frame, followed by four regular frames.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight sensor, comprising:
  a light sensing circuitry for detecting light and outputting light sensing signals; and
  a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames.

(2) The time-of-flight sensor of (1), wherein the sequencer circuitry includes a memory for storing sequence configurations, the sequence configurations determining the first and second set of registers and the defined sequence for the generation of the defined sequence of frames.

(3) The time-of-flight sensor of (2), wherein the sequence configurations are divided in a first part and in a second part, wherein the first part defines at least one of: number of types of frames, location of frames in the sequence of frames, trigger for first and second type of frames, and wherein the second part defines the first and second sets of registers.

(4) The time-of-flight sensor of (3), wherein the first part is stored in a first part of the memory and the second part is stored in a second part of the memory.

(5) The time-of-flight sensor of anyone of (1) to (4), wherein the sequencer circuitry is programmable.

(6) The time-of-flight sensor of anyone of (1) to (5), further comprising a multiplexer and a bus-interface, wherein the bus-interface and the sequencer circuitry are connected via the multiplexer to the register circuitry.

(7) The time-of-flight sensor of anyone of (1) to (6), further comprising a controller configured to generate the defined sequence of frames on the basis of the selected first and second sets of registers.

(8) The time-of-flight sensor of anyone of (1) to (7), wherein the sequencer circuitry sets the register circuitry according to the selected first and second sets of registers.

(9) The time-of-flight sensor of anyone of (1) to (8), wherein the first type of frames is configured for providing time-of-flight data and the second type of frames is configured for providing enhanced sensor data.

(10) A time-of-flight system, comprising:
  an illumination source,
  a time-of-flight camera having a time-of-flight sensor, including:
    a light sensing circuitry for detecting light and outputting light sensing signals; and
    a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames, and
  a host circuitry connected via a bus to the time-of-flight camera, wherein the host circuitry is configured to configure the sequencer circuitry.

(11) The time-of-flight system of (10), wherein the first type of frames is configured for providing data for a first mode and the second type of frames is configured for providing data for a second mode.

(12) The time-of-flight system of (11), wherein the illumination source is adapted to be driven in a first operation mode associated with the first mode and in a second operation mode associated with the second mode.

(13) The time-of-flight system of (12), wherein the first operation mode is at least one of a spotted illumination mode, a zone illumination mode and a uniform illumination mode and the second mode is at least one of a full-field illumination mode.

(14) The time-of-flight system of anyone of (11) to (13), wherein the first mode is a time-of-flight mode and the second mode is an enhanced sensor data mode.

(15) The time-of-flight system of (14), wherein the first mode includes at least one of the following modes: accuracy, processing load, measured range, motion robustness, power.

(16) The time-of-flight system of (14) or (15), wherein the second mode is at least one of the following modes: resolution, signal-to-noise ratio, two-dimensional imaging.

(17) The time-of-flight system of anyone of (10) to (16), wherein the generation of second type frames is started in response to a trigger event.

(18) The time-of-flight system of (17), wherein one second type frame is generated in response to the trigger event.

(19) The time-of-flight system of (17) or (18), wherein the second type frame is periodically generated.

(20) The time-of-flight system of anyone of (10) to (19), wherein the second type frames are generated periodically, according to a predetermined pattern, or randomly.

The invention claimed is:

1. A time-of-flight system, comprising:

an illumination source, a time-of-flight camera having a time-of-flight sensor, including:

a light sensing circuitry for detecting light and outputting light sensing signals; and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames, and a host circuitry connected via a bus to the time-of-flight camera, wherein the host circuitry is configured to configure the sequencer circuitry wherein the first type of frames is configured for providing data for a first mode and the second type of frames is configured for providing data for a second mode;

wherein the first mode is measured range mode;

wherein the second mode is signal-to-noise ratio mode; and wherein the time-of-flight sensor is configured to obtain the data for the measured range mode to determine a measured distance between the time-of-flight sensor and an object and subsequently obtain the data for the signal-to-noise ratio mode to adjust the measured distance between the time-of-flight sensor and the object.

2. The time-of-flight system of claim 1, wherein the illumination source is adapted to be driven in a first operation mode associated with the first mode and in a second operation mode associated with the second mode.

3. The time-of-flight system of claim 2, wherein the first operation mode is at least one of a spotted illumination mode, a zone illumination mode and a uniform illumination mode and the second mode is at least one of a full-field illumination mode.

4. The time-of-flight system of claim 1, wherein the generation of second type frames is started in response to a trigger event.

5. The time-of-flight system of claim 4, wherein one second type frame is generated in response to the trigger event.

6. The time-of-flight system of claim 4, wherein the second type frame is periodically generated.

7. The time-of-flight system of claim 1, wherein the second type frames are generated periodically, according to a predetermined pattern, or randomly.

8. The time-of-flight system of claim 1, wherein using the signal-to-noise ratio mode results in an improved distance accuracy over using a non-signal-to-noise ratio mode.

9. The time-of-flight system of claim 8, wherein the signal-to-noise ratio mode can be requested in real time.

10. A time-of-flight sensor, comprising:

a light sensing circuitry for detecting light and outputting light sensing signals; and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames wherein the first type of frames is configured for providing data for a first mode and the second type of frames is configured for providing data for a second mode wherein the first mode is measured range mode;

wherein the second mode is signal-to-noise ratio mode; and wherein the time-of-flight sensor is configured to obtain the data for the measured range mode to determine a measured distance between the time-of-flight sensor and an object and subsequently obtain the data for the signal-to-noise ratio mode to adjust the measured distance between the time-of-flight sensor and the object.

11. The time-of-flight sensor of claim 10, wherein the sequencer circuitry includes a memory for storing sequence configurations, the sequence configurations determining the first and second set of registers and a defined sequence for the generation of the defined sequence of frames.

12. The time-of-flight sensor of claim 11, wherein the sequence configurations are divided in a first part and in a second part, wherein the first part defines at least one of: number of types of frames, location of frames in the sequence of frames, trigger for first and second type of frames, and wherein the second part defines the first and second sets of registers.

13. The time-of-flight sensor of claim 12, wherein the first part is stored in a first part of the memory and the second part is stored in a second part of the memory.

14. The time-of-flight sensor of claim 10, wherein the sequencer circuitry is programmable.

15. The time-of-flight sensor of claim 10, further comprising a multiplexer and a bus-interface, wherein the bus-interface and the sequencer circuitry are connected via the multiplexer to the register circuitry.

16. The time-of-flight sensor of claim 10, further comprising a controller configured to generate the defined sequence of frames on the basis of the selected first and second sets of registers.

17. The time-of-flight sensor of claim 10, wherein the sequencer circuitry sets the register circuitry according to the selected first and second sets of registers.

17

18. The time-of-flight sensor of claim 10, wherein the first type of frames is configured for providing time-of-flight data and the second type of frames is configured for providing enhanced sensor data.

19. The time-of-flight sensor of claim 10, wherein using the signal-to-noise ratio mode results in an improved distance accuracy over using a non-signal-to-noise ratio mode.

20. A time-of-flight system, comprising:

a time-of-flight camera having a time-of-flight sensor, including:

a light sensing circuitry for detecting light and outputting light sensing signals; and a logic circuitry for processing the light sensing signals from the light sensing circuitry, wherein the logic circuitry includes a sequencer circuitry and a register circuitry, wherein the register circuitry includes multiple registers for storing data which are derived on the basis of the light sensing signals and wherein the sequencer circuitry is adapted to select at least a first set of registers of the register circuitry and a second set of registers of the register circuitry for dynamically providing a first type of frames based on the selected first set of registers and a second type of frames based on the selected second set of registers, wherein first type frames and second type frames are generated in a defined sequence of frames, and a host circuitry connected via a bus to the time-of-flight camera, wherein the host circuitry is configured to configure the sequencer circuitry wherein the first type of frames is configured for providing data for a first mode and the second type of frames is configured for providing data for a second mode;

wherein the first mode is motion robustness mode;

wherein the second mode is signal-to-noise ratio mode; and wherein the time-of-flight sensor is configured to obtain the data for the motion robustness mode to determine a measured distance between the time-of-flight sensor and an object and subsequently obtain the data for the signal-to-noise ratio mode to adjust the measured distance between the time-of-flight sensor and the object.

*    *    *    *    *